(12) United States Patent
Nagasaka

(10) Patent No.: US 6,603,236 B2
(45) Date of Patent: *Aug. 5, 2003

(54) ELECTRONIC TIMEPIECE

(75) Inventor: Eiichi Nagasaka, Nagano-ken (JP)

(73) Assignee: Seiko Epson Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/380,935

(22) PCT Filed: Jan. 22, 1999

(86) PCT No.: PCT/JP99/00288

§ 371 (c)(1),
(2), (4) Date: Oct. 12, 1999

(87) PCT Pub. No.: WO99/38241

PCT Pub. Date: Jul. 29, 1999

(65) Prior Publication Data

US 2002/0067099 A1 Jun. 6, 2002

(30) Foreign Application Priority Data

Jan. 22, 1998 (JP) ............................................ 10-010835

(51) Int. Cl.⁷ .................. G04C 10/00; H02K 21/00; H02K 1/02
(52) U.S. Cl. .................. 310/254; 310/156.01; 310/49 R; 310/75 R; 968/553
(58) Field of Search .......................... 310/49 R, 156, 310/254, 216, 75 R; 968/553

(56) References Cited

U.S. PATENT DOCUMENTS

| 4,720,644 A | * | 1/1988 | Sedlack | 310/49 R |
| 5,096,513 A | | 3/1992 | Sawa et al. | 148/304 |
| 5,496,418 A | | 3/1996 | Ramanan et al. | 148/304 |
| 5,517,469 A | | 5/1996 | Wiget | 368/140 |
| 5,780,951 A | * | 7/1998 | Stephens | 310/172 |
| 5,923,619 A | | 7/1999 | Knapen et al. | 368/64 |

FOREIGN PATENT DOCUMENTS

| EP | 55 056 453 | 4/1980 | H02K/21/02 |
| EP | 0 239 820 | 10/1987 | G04C/10/00 |
| EP | 0 751 445 | 10/1987 | G04C/10/00 |
| GB | 1 525 276 | 9/1978 | C22C/38/00 |
| GB | 5 525 959 | 9/1978 | C22C/19/07 |
| JP | 51-65395 | 6/1976 | H01F/1/14 |
| JP | 51-77899 | 7/1976 | H01F/3/08 |
| JP | 55-46838 | 4/1980 | H02K/1/02 |
| JP | 58-134049 | 9/1983 | H02K/1/14 |
| JP | 63-172281 | 11/1988 | H02K/37/16 |
| JP | 7-38029 | 4/1995 | H02K/7/18 |
| JP | 7-69440 | 7/1995 | G04C/10/00 |
| JP | 7-119812 | 12/1995 | G04C/10/00 |
| JP | 8-5754 | 1/1996 | G04B/23/02 |
| JP | 8-50186 | 2/1996 | H02P/9/04 |
| JP | 9-211152 | 8/1997 | G04C/10/00 |

* cited by examiner

Primary Examiner—Burton S. Mullins

(57) ABSTRACT

In an electromagnetic converter comprising a rotor arranged by including a permanent magnet, a yoke disposed in the vicinity of the rotor for flowing magnetic flux and a coil wound around the yoke, at least a portion of the yoke is composed of an amorphous metal magnetic material. The amorphous metal magnetic material is a Co amorphous metal or a Fe amorphous metal. The electromagnetic converter is a small generator, a motor and the like. In an electronic timepiece provided with a generator device, the Co amorphous metal magnetic material is used for a first yoke (stator) and the Fe amorphous metal magnetic material is used for a second yoke (coil core). In an electronically-controlled mechanical watch, the Co amorphous metal magnetic material is used for a yoke. Portable electronic equipment is a timepiece provided with the electromagnetic converter, and so forth 24 Claims, 8 Drawing Sheets

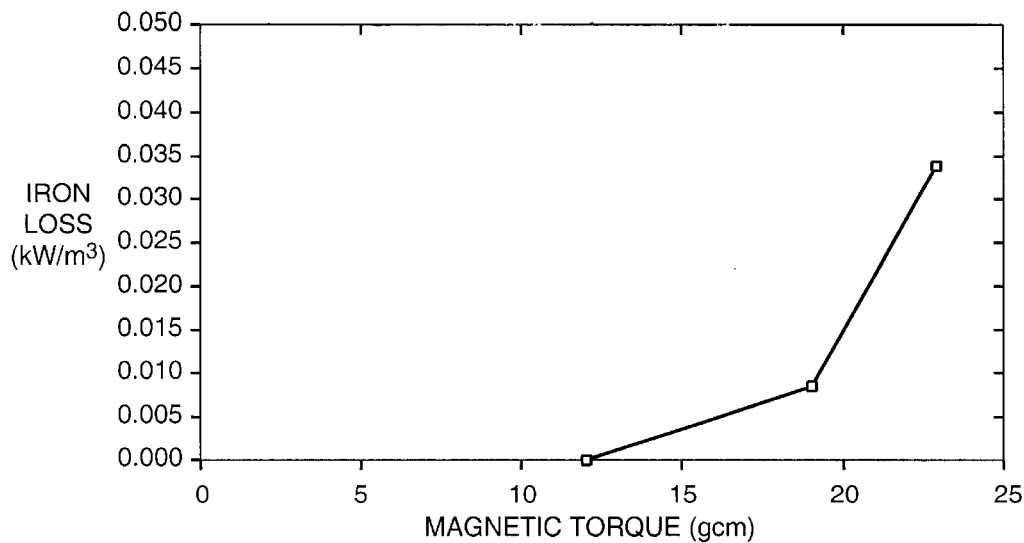
FIG._1
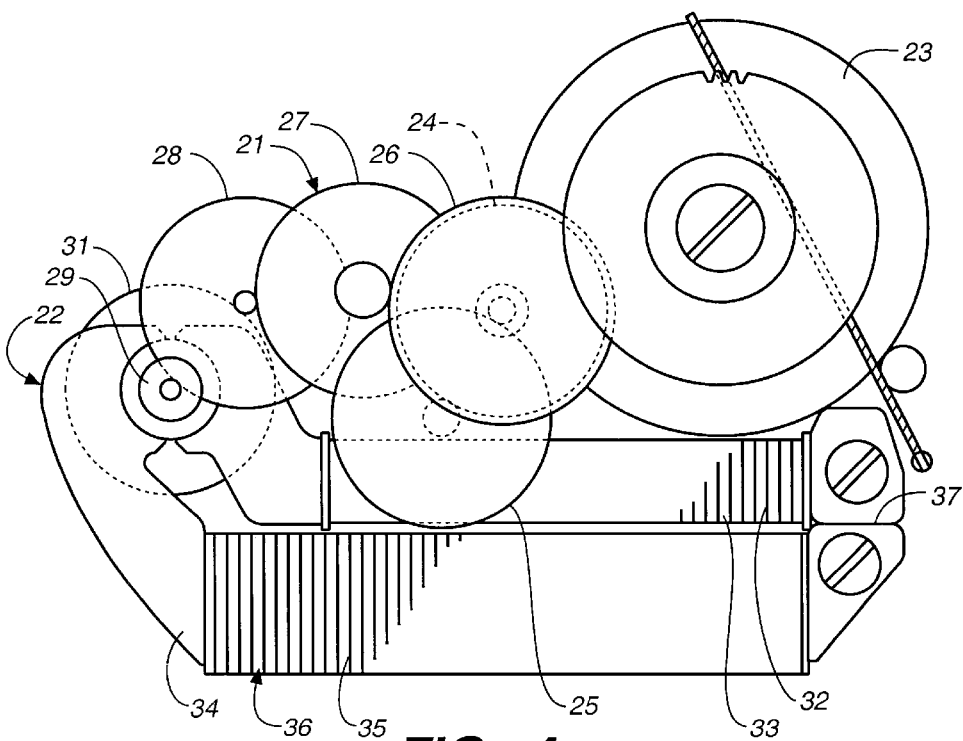
FIG._4

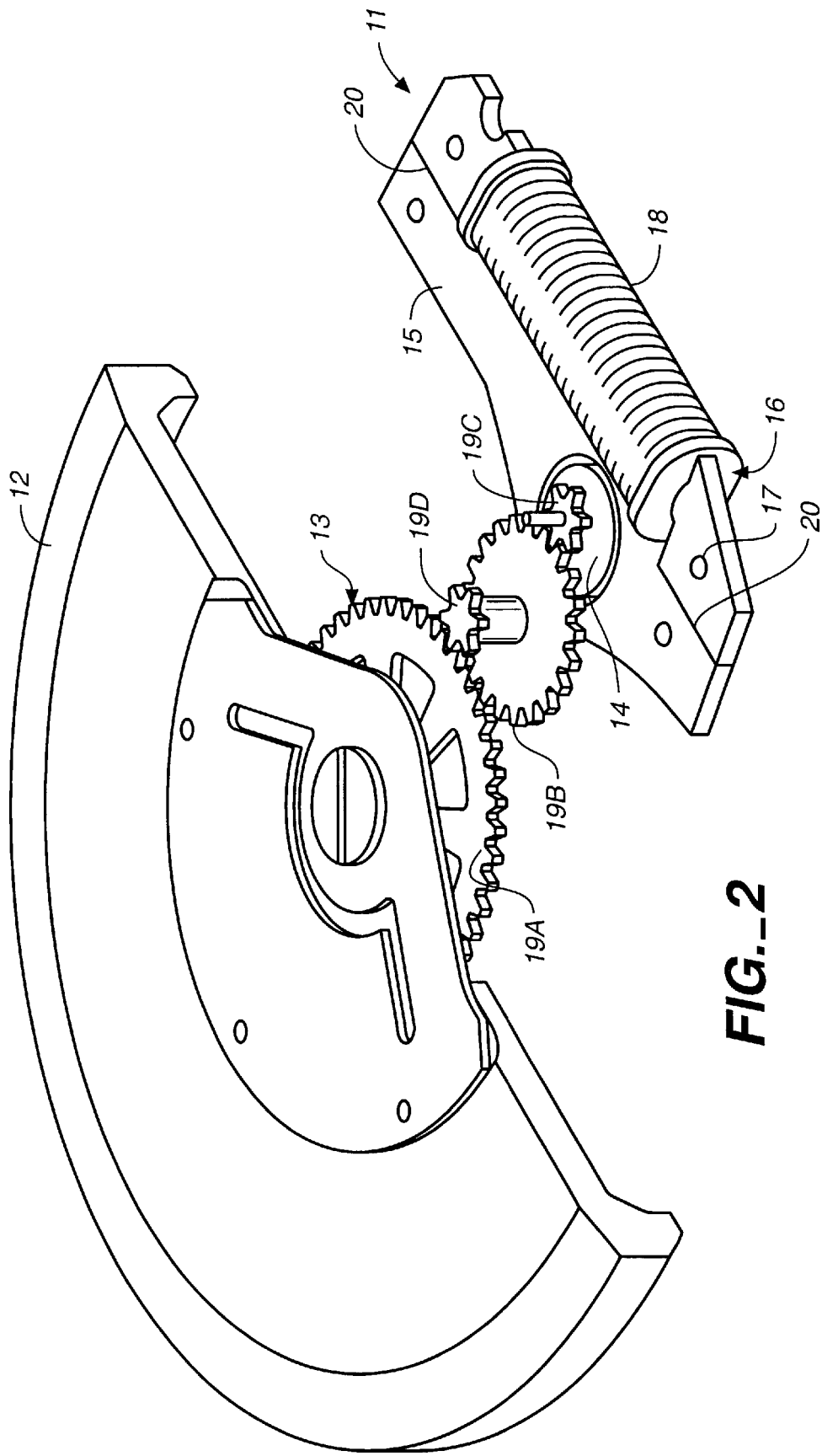
FIG._2

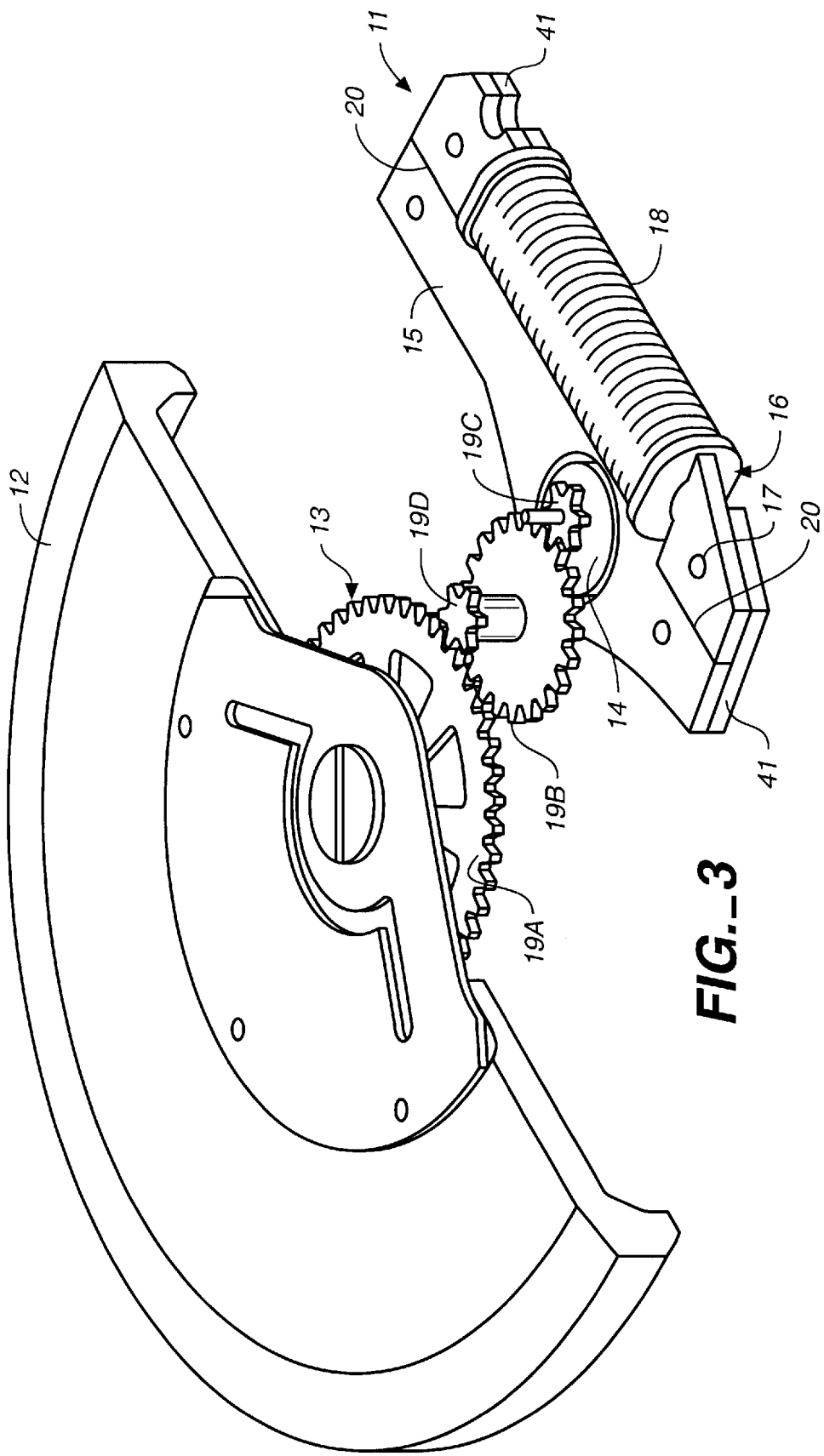
FIG._3

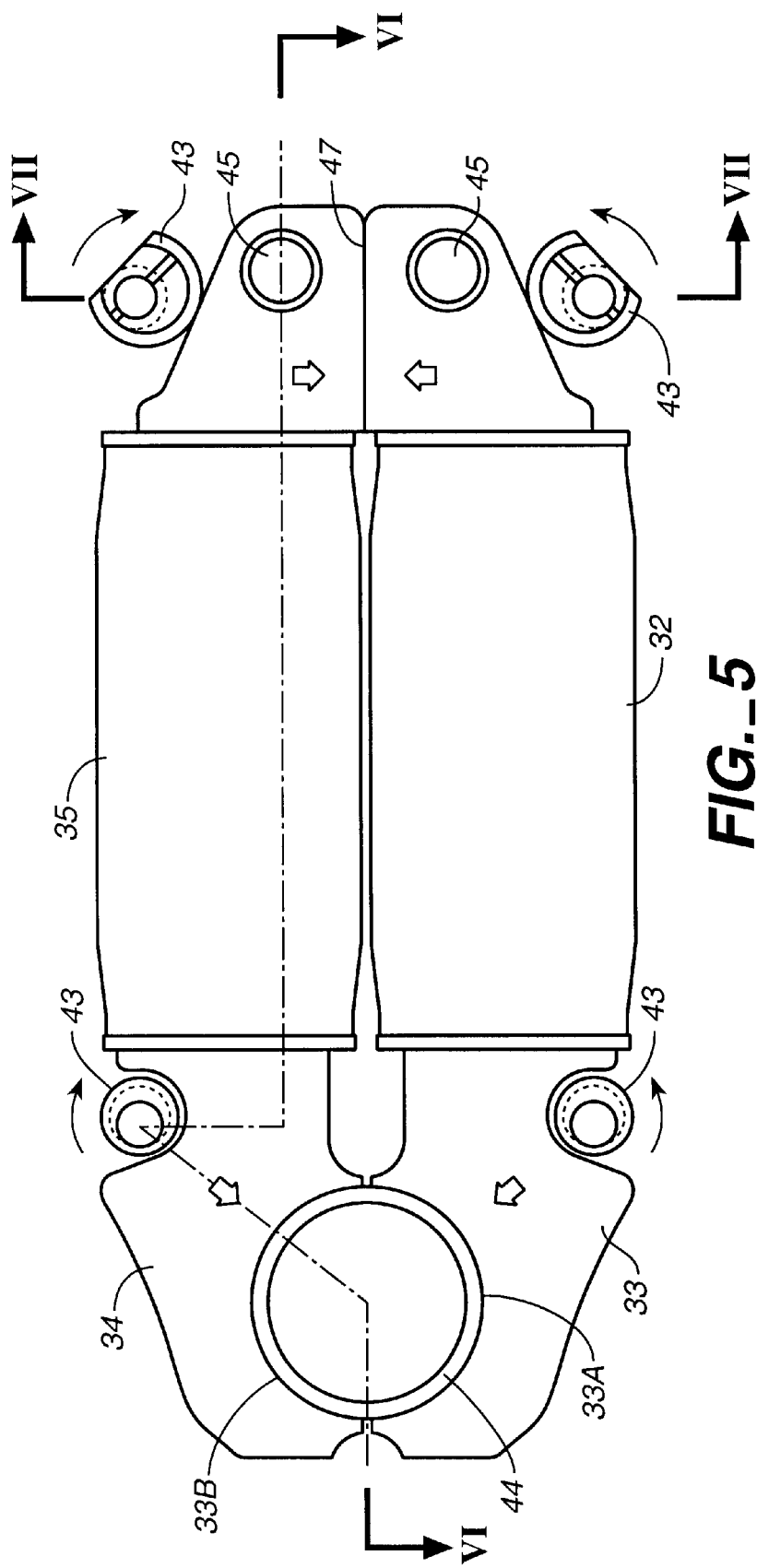
FIG._5

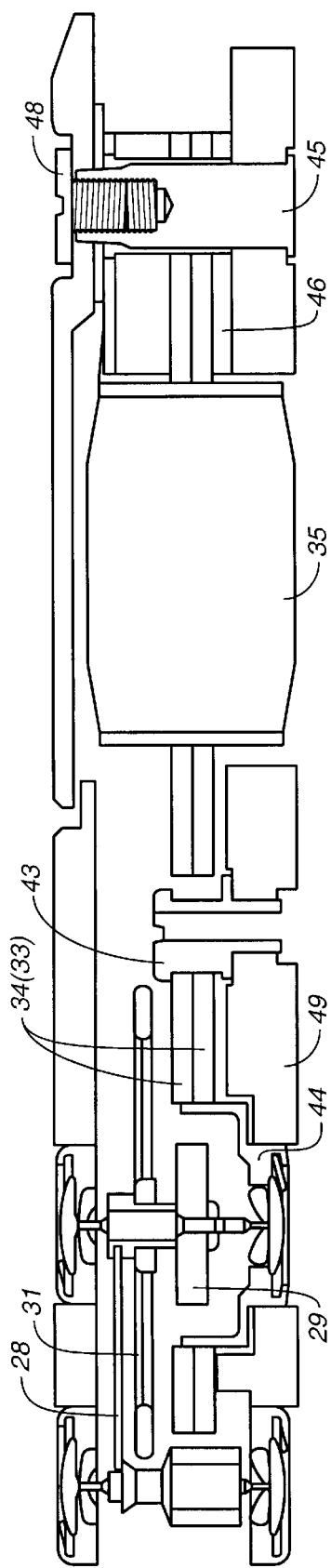
FIG._6
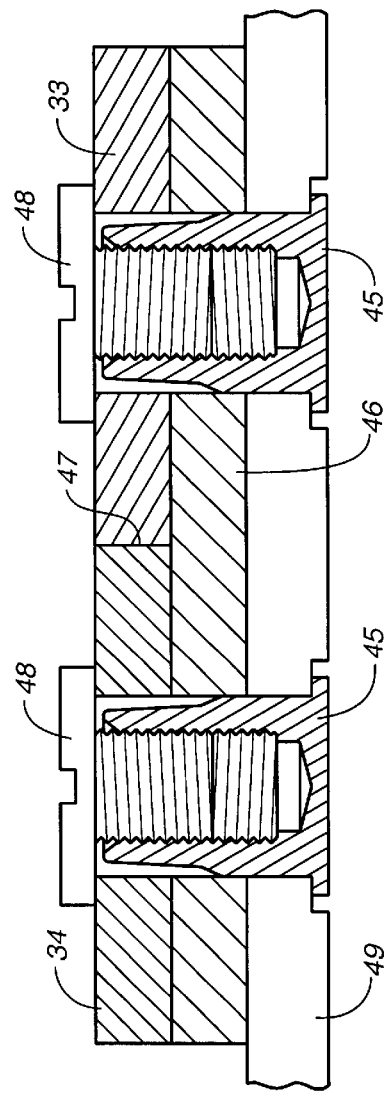
FIG._7

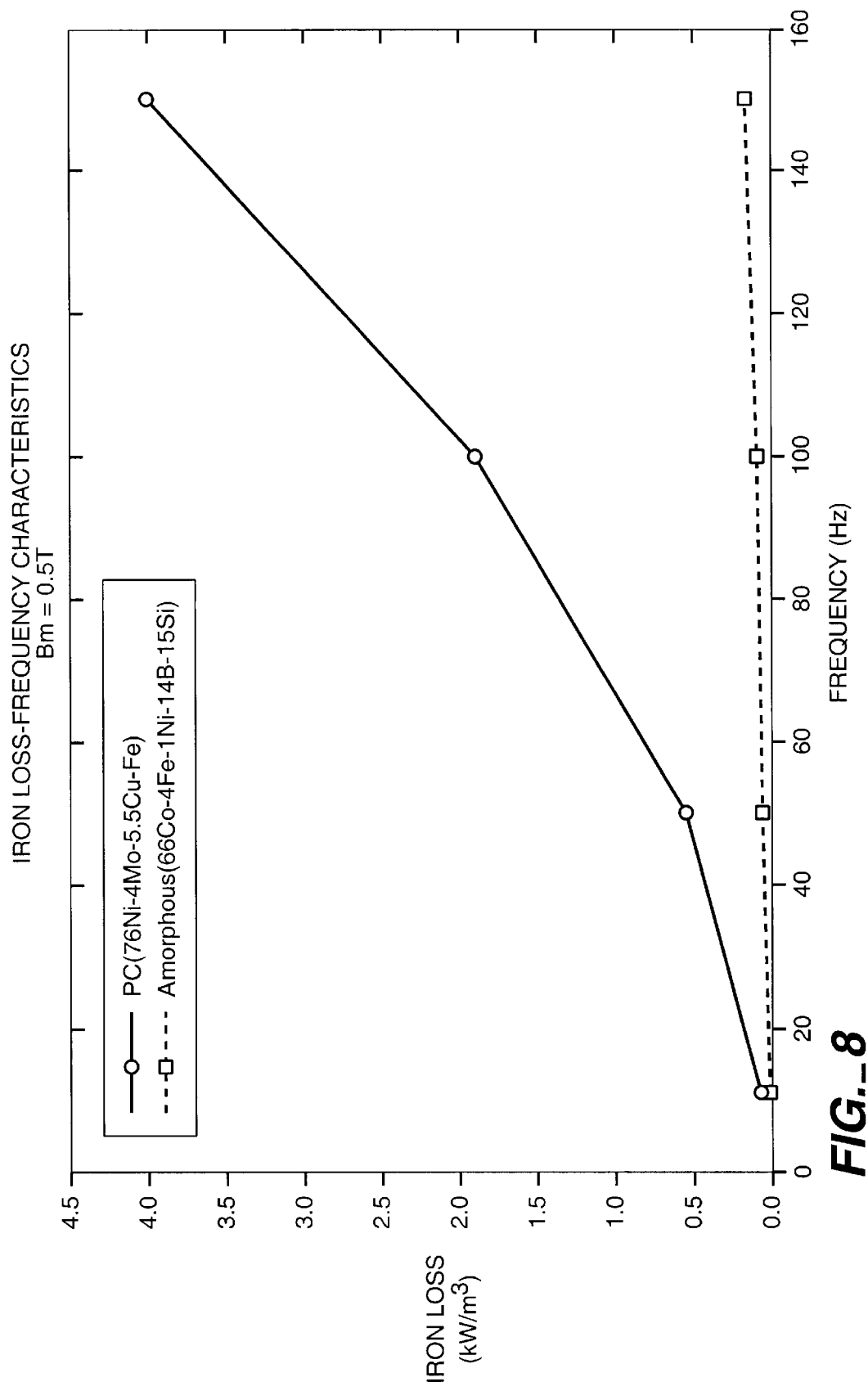
FIG._8

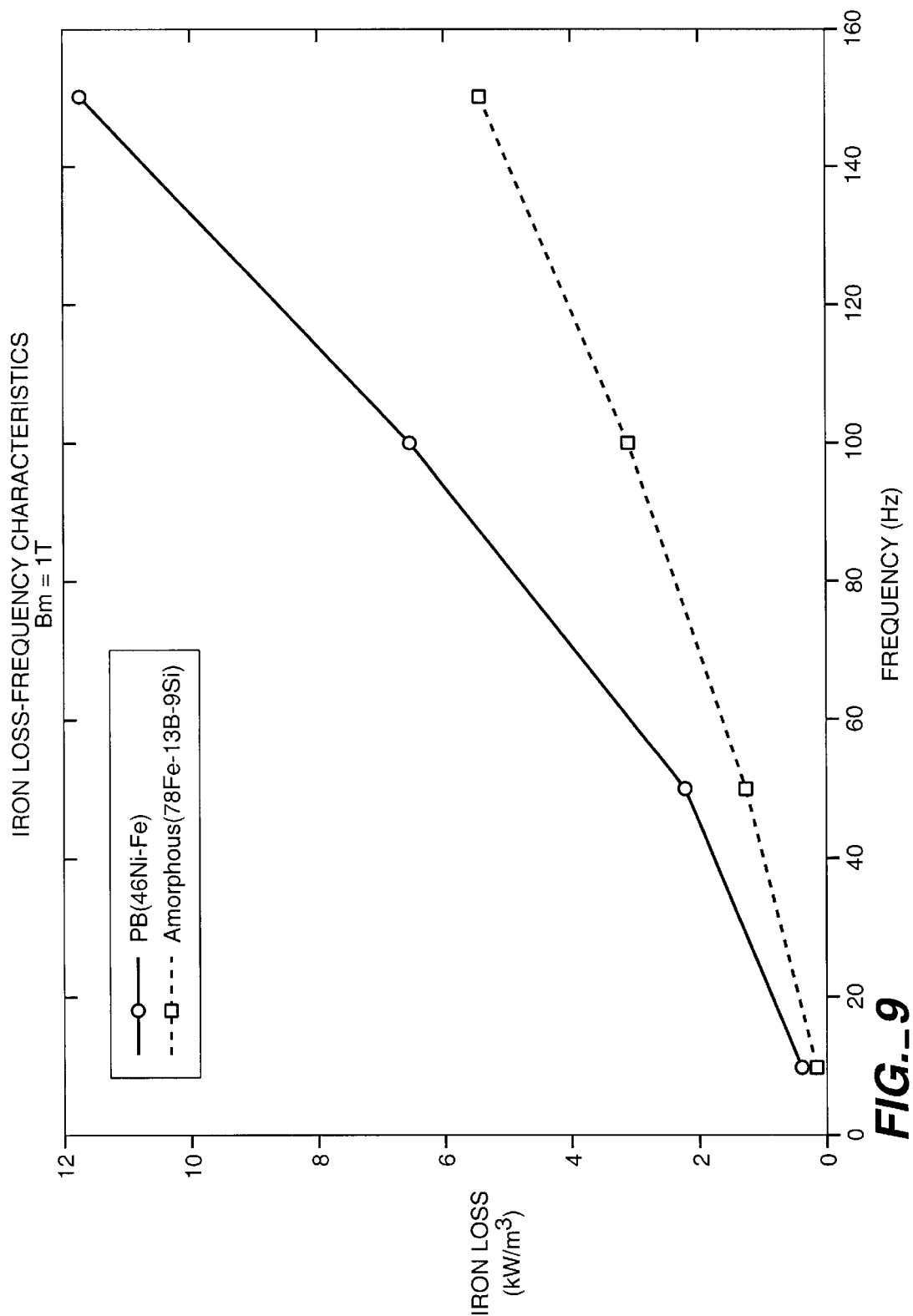
FIG._9

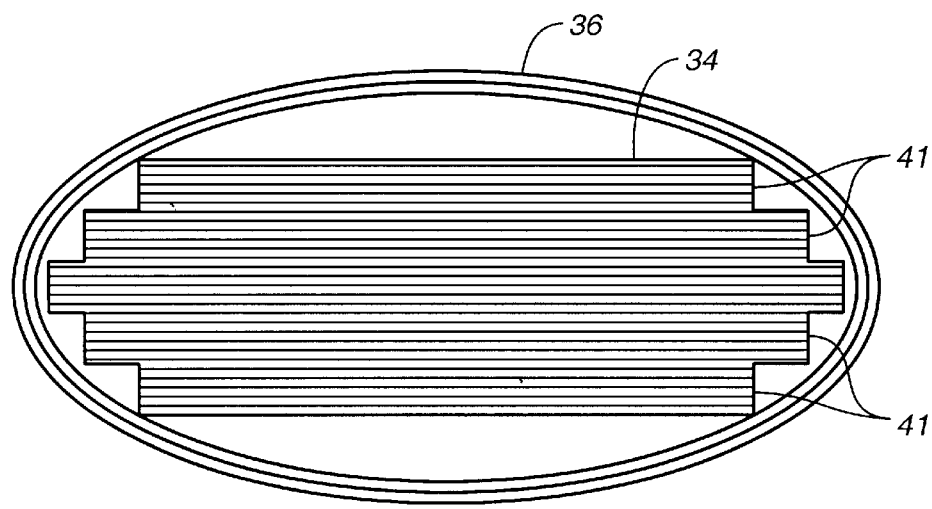
FIG._10
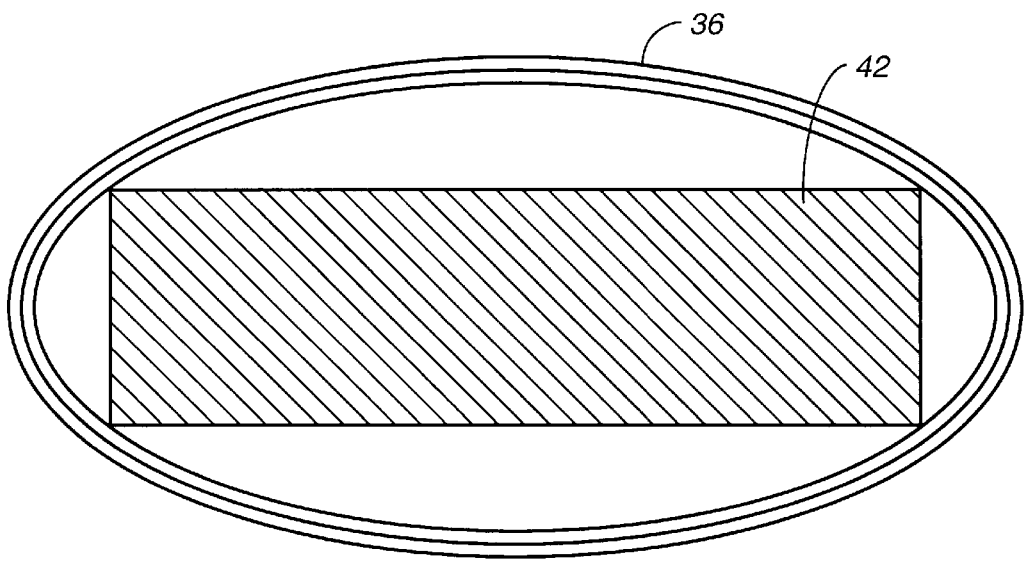
FIG._11

ELECTRONIC TIMEPIECE

TECHNICAL FIELD

The present invention relates to an electromagnetic converter such as a small generator, a motor and so on and to electronic equipment provided therewith, and the present invention is particularly applicable to a wrist watch and the like.

BACKGROUND ART

Conventionally, electronically-controlled mechanical timepieces hereinafter, referred to as electronically-controlled mechanical watches) are known which F, convert mechanical energy, which is generated by releasing a mainspring, into electric energy through an electromagnetic converter, control the value of a current flowing in the coil of the electromagnetic converter by actuating a rotation control means by the electric energy and display a time by driving hands fixed to a train wheel (Japanese Examined Patent Publication No. 7-119812 and Japanese Unexamined Patent Publication No. 8-50186, etc.).

Further, Japanese Unexamined Patent Publication No. 8-5758 proposes, in order to improve the efficiency for converting mechanical energy into electric energy, an arrangement using PC permalloy (hereinafter, referred to as, PC material) having a coercive force smaller than that of PB permalloy (hereinafter, referred to as PB material) so as to reduce the hysteresis loss of a stator and a coil core, which constitute the magnetic circuit of a generator in the electronically-controlled mechanical watches.

In contrast, recently proposed are electronic timepieces provided with generators (Japanese Examined Patent Publication No. 7-38029 and so on). The electronic timepiece is arranged such that the generator is assembled to a wrist watch main body. Electric energy necessary to drive the wrist watch is generated by the movement of an arm and accumulated in a capacitor and an electronic circuit is driven by the electric energy. In the wrist watch to which the generator is assembled, the power of a rotary movement weight is transmitted to the generator through a power transmission mechanism composed of a speed increasing train wheel, and electric power is generated by causing an electromagnetic inducing action on a coil due to the change of a magnetic field which is generated by the rotation of the rotor.

These generators comprise a rotor including a permanent magnet, a first yoke disposed around the rotor and a second rotor connected to the first yoke and including a coil. The second yoke is placed on the first yoke and the magnetic induction from the upper yoke to the lower yoke is secured through screws as shown in the drawings in Japanese Examined Patent Publication No. 7-38029.

The PC material, PB material and the like are ordinarily used as the material of the yokes of the magnetic converter.

In the electronic timepiece provided with the generator device, since the first yoke (stator) has no coil wound therearound, copper loss (electric resistance) is not increased by a wound coil. Thus, the PC material is used as the first yoke because it can increase a sectional area and accordingly it has magnetic flux density as small as 0.7 T and its iron loss is also small. In contrast, since the second yoke (coil core) has a coil wound therearound, when the sectional area thereof is increased, the length of a coil wire is increased and copper loss is increased thereby. Thus, the PB material is used in the second yoke because it has relatively high saturation magnetic flux density of 1.4 T, although it has iron loss larger than that of the PC material. That is, in the second yoke, the use of the PB material, which has large iron loss but can secure necessary magnetic flux even if the sectional area thereof is reduced, can decrease total loss as compared with the use of the PC material, which must increase the sectional area by which the copper loss of the winding thereof is increased, although its iron loss is low. Accordingly, the PB material is used in the second yoke.

In the electronic timepieces with the generators, when a speed increasing ratio achieved by the power transmission mechanism of an electromagnetic converter is set to about 100 in a generator, a rotor often operates at 50 to 150 Hz when the wrist watch is worn. As a result, iron loss is increased because an alternating-current magnetic field is generated to the yoke and an eddy current is generated to the material. Therefore, to develop an effective generator, a material having low iron loss is required in an alternating-current region (50–150 Hz).

When a secondary power supply such as a capacitor or the like is to be charged, a voltage effective at charging is obtained at a frequency of 50 Hz or more. Thus, a material having small iron loss in the alternating-current region is required also from this point of view.

Therefore, in the electronic timepieces provided with the generator devices, a material having small iron loss is required for the first yoke (stator) around which no coil is wounded. Whereas, a material having small iron loss and high saturation magnetic flux density is required for the second yoke (coil core) around which the coil is wound.

Further, the magnetic flux flowing in the magnetic circuit of the electronically-controlled mechanical watches is smaller by one order of magnitude as compared with that of the electronic timepieces provided with the generator devices and further the electronically-controlled mechanical watches have coil windings. Thus, even if the sectional area of the yoke of the electronic timepieces is reduced to decrease iron loss, the magnetization flux density is not saturated. Therefore, the PC material having the saturation magnetic flux density as small as 0.7 T is used in the electronic timepieces.

In the electronically-controlled mechanical watches, almost all the losses of the electromagnetic converter result from iron loss and the mechanical loss of gears and bearings (abbreviated as mechanical loss). A reason why the mechanical loss is caused by the speed increase near to 100,000 to 300,000 times, and further the mechanical loss has characteristics that it is proportional to iron loss. Therefore, reduction of iron loss is a subject for decreasing the total loss. In addition, the reduction of the iron loss is important because a duration time depends on the magnitude of the rotation load torque (magnetic torque) of the generator.

DISCLOSURE OF THE INVENTION

The present invention is an electromagnetic converter comprising a rotor arranged by including a permanent magnetic yoke disposed in the vicinity of the rotor for flowing magnetic flux and a coil disposed in the vicinity of the yoke, and the electromagnetic converter is characterized in that at least a portion of the yoke is composed of an amorphous metal magnetic material.

Further, the present invention is electronic equipment provided with the electromagnetic converter. The electronic equipment is preferably arranged, as portable type electronic equipment and most preferably arranged as, for example, a portable timepiece.

The electromagnetic converter includes a small generator, a motor and the like.

According to the present invention, the improvement of efficiency of a generator which is achieved by the reduction of iron loss can increase a duration time in the electronically-controlled mechanical watches and can reduce the size of a rotary movement weight in the electronic timepieces provided with generator devices, whereby the size and thickness of the timepieces can be reduced.

The yoke is ordinarily composed of magnetic members comprising at least two magnetic materials, and it is preferable that at least one of the magnetite members be composed of the amorphous metal magnetic material.

In the magnetic material, when magnetic flux flows, an anti-magnetic field is; produced in the direction of the flow and acts to prevent the flow of the magnetic flux. For example, when two flat-sheet-shaped magnetic materials are jointed to each other with the upper and lower surfaces thereof overlapped partially, a magnetization direction (direction in which magnetic flux flows) is the thickness direction of the magnetic materials. The intensity Hd of the anti-magnetic field is determined by the ratio of a plane surface area S to a sheet thickness T, which is represented by a formula $Hd=k\,(S/T)$ (k: constant).

Therefore, in the amorphous metal magnetic material, when a thickness of a sheet is set to, for example, 25 $\mu$m, since the sheet is thinner than the thickness 0.5 mm of a conventional material, for example, a PC material, the amorphous metal magnetic material is greatly affected by the anti-magnetic field and the magnetic flux is difficult to flow therein. As a the characteristics of the amorphous metal magnetic material are inferior to those of the PC material.

Thus, when at least two flat-sheet-shaped magnetic members composed of the above magnetic material are in contact with each other, if the sides thereof are approximately in contact with or jointed to each other as in the present invention (hereinafter, referred to as m contact with each other), the effect of the anti-magnetic field can be removed by flowing magnetic flux only in the lengthwise direction of the flat sheets.

Further, the addition of a joint member to at least one of the two magnetic members, which are in contact with each other and located on an upper side and a lower side, permits the magnetic flux to flow more easily.

When a magnetic circuit is arranged by coupling both the magnetic members to each other through the joint member, magnetic flux can be increased. Note that joint member need not be as thick as the magnetic members and it is sufficient for the thickness thereof to be half the thickness of the magnetic members. While it is preferable that the material of the joint member be a PC material which is difficult to be affected by the anti-magnetic field and the raw material thereof is available in a large thickness, it may be composed of an amorphous material (in particular, a Co type).

A specific example of the amorphous metal magnetic material is a Co amorphous metal.

The Co amorphous metal magnetic material contains Co in an amount of at least 50 wt %. It may contain Fe, Ni, B, Si and the like as other elements.

Further, a specific example of the amorphous metal magnetic material may be a Fe amorphous metal.

The Fe amorphous metal contains Fe in an amount of at least 50 wt %. It may contain B, Si and the like as other elements.

A specific example of the electronic equipment of the present invention is, for example, an electronically-controlled timepiece to which a small generator is assembled.

The electronically-controlled timepiece includes (1) an electronic timepiece provided with a generator device for generating power using a rotary movement weight, (2) an electronically-controlled mechanical watch, (3) a quartz watch driven by a step motor, and so forth.

Next, detailed description will be made as to the items (1) and (2).

First, the electronic timepiece provided with the generator device of the item (1) will be described.

The electronic timepiece is arranged by comprising at least a generator as the electromagnetic converter of the present invention, a storage means for storing the electromotive force of the generator, a timepiece circuit driven by the storage means, and a timepiece display unit driven by the timepiece circuit.

The generator of the electronic timepiece shown in the item (1) specifically comprises a rotary movement weight and a power transmission mechanism for transmitting the power of the rotary movement weight to the small generator.

The rotary movement weight generates mechanical energy.

The power transmission mechanism comprises a speed increasing train wheel having a plurality of combined gears.

The Co amorphous metal magnetic material is used for a first yoke (stator) in the generator of the electronic timepiece provided with the generator device, and the Fe amorphous metal magnetic material is used for a second yoke.

In the first yoke (stator), since no coil is wounded therearound, iron loss is not increased thereby. Thus, it is preferable to use the Co amorphous metal magnetic material in the first yoke (stator) because it can increase the cross sectional area of the first yoke, has low iron loss and low saturation magnetic flux density (0.7 T).

In contrast, in the second yoke (coil core), since a coil is wound therearound, when a cross sectional area is increased by the use of the Co amorphous metal magnetic material to prevent saturation, the length of a coil wire is increased, thereby increasing copper loss. Thus, reducing the cross-sectional area by the use of the Fe amorphous metal magnetic material, which has high saturation magnetic flux density (1.4 T) while the iron loss thereof is larger than that of the Co amorphous metal magnetic material, can reduce total loss rather than increasing copper loss by winding a coil around the Co amorphous metal magnetic material having a large cross sectional area. Therefore, it is preferable to use the Fe amorphous metal magnetic material.

Next, the electronically-controlled mechanical watch of the item (2) will be described.

The electronically-controlled mechanical watch shown in the item (2) is arranged by comprising, a main spring, a generator for converting the mechanical energy of the mainspring which is transmitted through a train wheel into electric energy, a time display hands coupled to the train wheel, a reference signal source such as a crystal oscillator or the like which is driven by the converted electric energy and a rotation control means driven by the converted electric energy similarly for controlling the rotation cycle of the generator. The yokes of the electronically-controlled mechanical watch are composed of the Co amorphous metal magnetic material.

In the electronically-controlled mechanical watch, since the magnetic flux flowing in a magnetic circuit is small and the watch is provided with a coil winding, no saturation is reached even if the cross sectional area of the yokes is reduced. This is a reason why a material having low iron loss such as the Co amorphous metal magnetic material is preferably used.

Specifically, the composition of the Co amorphous metal magnetic material is, for example, 66Co-4Fe-1Ni-14B-15Si.

Further, the composition of the Fe amorphous metal magnetic material is, for example, 78Fe-13B-9Si.

As shown in FIG. 1, in the measurement of the relationship between the magnetic torque (rotation load torque) of a rotor and the iron loss of a yoke, a decrease in iron loss reduces magnetic torque. Accordingly, the magnetic torque can be reduced by the use of an amorphous metal magnetic material having small iron loss. As a result, the rotation load torque necessary to drive the rotor of the generator can be reduced and the period of time during which the mainspring of the electronically-controlled mechanical watch is used (duration time) can be increased. Note that the reduction of the rotation load torque for driving the rotor of the generator also permits the reduction in size of, for example, the rotary movement weight and the generator in the electronic timepiece provided with the generator.

A generated voltage necessary to drive the IC of the electronically-controlled mechanical watch is at least 1 V. As can be seen from the following Table 1, to achieve this voltage, the torque required by a movement barrel which constitutes one gear of the train wheel by the gear in which the mainspring is accommodated is at least 30 gcm when the yokes are composed of the PC material and at least 20 gcm when the yokes are composed of the Co amorphous material. When torque is greater than the above value, the voltage of a capacitor in which the electromotive force of the generator is stored (the IC is driven by the output from the capacitor) is made to at least 1 V.

TABLE 1

|  | Amorphous | PC material |
|---|---|---|
| Input energy | 0.76 µW | 1.16 µW |
| (power generation torque) | 20.1 gcm | 30.6 gcm |
| Output energy | 0.117 µW | 1.106 µW |
| (capacitor voltage) | 1.08 V | 1.03 V |
| Power generation efficiency | 15.4% | 9.1% |

Preconditions: Obtained from an experiment in which a rotor frequency was set to 10 Hz and a speed increasing ration from a movement barrel to a rotor was set to 162,000.

A period of time from a time when a mainspring is fully wound to a time when it is rewound, that is, a duration time can be determined by (speed increasing ratio×number of turns of mainspring)÷(rotor frequency×60×60 hours). Specifically, as shown in Table 1, when the yokes are composed of the PC material and a timepiece employs a train wheel having a speed increasing ratio of 162,000, if the number of turns of the mainspring which is effective to the duration time is about 5.3 turns, a calculated duration time is 24 hours. When the yokes of the generator is composed of an amorphous material, if the yokes are used by increasing the speed increasing ratio to 1.5 times the above speed increasing ratio, that is, to 243,000 in correspondence to the reduction of the power generation torque to $1/1.5$ (since the rotational speed of the rotor is constant, the rotational speed of the movement barrel is reduced to $1/1.5$), the duration time of 1.5 times the above duration time, that is, 36 hours can be achieved in the same effective number of turns (5.3 turns).

In contrast, in the electronic timepiece provided with the generator device., the rotary movement weight by which driving power is generated from the generator can be easily moved because the aforesaid magnetic torque is reduced.

BRIEF DESCRIPTION OF THE DRAWINGS

FIG. 1 is a graph showing the result of measurement of the relationship between the magnetic torque (rotation load torque) of a rotor and iron loss.

FIG. 2 is a perspective view of the main portion of a wrist watch according to a first embodiment of the present invention.

FIG. 3 is a perspective view of the main portion showing another arrangement of the wrist watch according to the first embodiment.

FIG. 4 is a plan view showing the main portion of a wrist watch according to a second embodiment of the present invention.

FIG. 5 is a plan view showing the main portion of another arrangement of the wrist watch according to the second embodiment.

FIG. 6 is a sectional view of the wrist watch according to FIG. 5 taken along the line VI—VI of FIG. 5.

FIG. 7 is a sectional view taken along the line VII—VII of FIG. 5 and shows the main portion of the connecting section of the wrist watch according to FIG. 5.

FIG. 8 is a graph showing the result of measurement of the iron loss-frequency characteristics of a Co amorphous metal and a PC material according to the embodiment 1.

FIG. 9 is a graph showing the result of measurement of the iron loss-frequency characteristics of a Fe amorphous metal and a PB material according to the embodiment 1.

FIG. 10 is a sectional view of a yoke according to the embodiment 2.

FIG. 11 is a sectional view of a yoke according to a conventional example.

BEST MODE FOR CARRYING OUT THE INVENTION

First Embodiment

A small generator according to the embodiment and a portable electronic equipment provided with it will be described with reference to FIG. 2.

The small generator of the embodiment is assembled with a wrist watch (an electronic timepiece provided with a generator device) as portable electronic equipment including a self-power-generating-system.

As shown in FIG. 2, the wrist watch comprises a small generator 11, a rotary movement weight 12, a power transmission mechanism 13 for transmitting the power of the rotary movement weight 12 to the small generator 11, an energy store (such as a capacitor a storage means (not shown) connected to both the ends of the wire 18 of the small generator 11 for storing the electromotive force of the small generator 11, a watch circuit driven by the storage means, a stepping motor driven by the watch circuit, a gear train wheel driven by the stepping motor, hands attached to the shafts of gears in the gear train wheel, and the like.

The small generator 11 comprises a rotor 14 arranged by including a permanent magnet, a first yoke 15 disposed around the rotor 14, and a second yoke 17 connected to the first yoke 15. The second yoke 17 includes a coil 16 around which the wire 18 is wound.

The rotary movement weight 12 has a semi-circular shape and its center of gravity is dislocated from the center of rotation thereof.

The power transmission mechanism 13 comprises a plurality of gears 19A–19D each having a different number of teeth, and the rotation of the rotary movement weight 12 is transmitted to the rotor 14 of the small generator 11 therethrough at a desired speed increasing ratio, for example, at a speed increasing ratio increased to 100 times the rotational speed of the rotary spindle 12.

In the embodiment, the junction 20 of the first yoke 15 to the second yoke 17 is formed by joining the sides of both the yokes 15 and 17. At least one of both the yokes 15 and 17 is composed of a Co amorphous metal magnetic material or a Fe amorphous metal magnetic material.

As shown in FIG. 3, in the wrist watch according to the embodiment, it is preferable that joint members 41 be attached under the first and second yokes 15 and 17 and both the yokes 15 and 17 are coupled to each other through the joint members 41. The joint members 41 are preferably composed of the Co amorphous metal magnetic material, the Fe amorphous metal magnetic material or a PC material.

Second Embodiment

A small generator according to the embodiment and a portable electronic equipment provided with it will be described with reference to FIG. 4.

The small generator of the embodiment is assembled with an electronically-controlled mechanical watch as the portable equipment.

As shown in FIG. 4, the electronically-controlled mechanical watch according to the embodiment is arranged by including a train wheel 21, a generator 22 and the like.

The train wheel 21 includes a movement barrel 23 in which a mainspring is accommodated, a center wheel 24, a third wheel 25, a second wheel 26, a fifth wheel 27 and a sixth wheel 28.

The generator 22 includes a rotor 31 having a magnet 29, a first yoke 33 having a winding 32 of 40,000 turns and a second yoke 34 composed of a coil 36 having a winding 35 of 110,000 turns.

In the generator, the rotation of the movement barrel 23 is sequentially increased through the center wheel 24, the third wheel 25, the second wheel 26, the fifth wheel 27 and the sixth wheel 28 and transmitted to the rotor 31 by being finally increased to 243,000 times the original rotation thereof.

In the embodiment, the junction 37 of the first yoke 33 to the second yoke 34 is formed by joining the sides of both the yokes 33 and 34. At least one of both the yokes 33 and 34 is composed of the Co amorphous metal magnetic material or the Fe amorphous metal magnetic material.

Note that the first and second yokes 33 and 34 are formed symmetrical with respect to the right and left sides thereof as shown in FIG. 5, different from the yokes 33 and 34 shown in FIG. 4. On the left side of FIG. 5, openings 33A and 33B in which the magnet 29 of the rotor 31 is accommodated, are positioned with respect to a positioning member 44 composed of a non-magnetic material such as brass and attached to a main plate 49. At the time, since the sides of the yokes 33 and 34 are pressed by an eccentric pin 43 rotatably inserted into the main plate 49, the openings 33A and 33B are pressed against the positioning member 44, whereby the yokes 33 and 34 are positioned. On the right side of the FIG. 5, both the yokes 33 and 34 are positioned through the guide holes thereof fitted on guide pins 45 and both the yokes 33 and 34 are secured to the main plate 49 by screws 48 screwed into the guide pins 45. Since the junction 47 of the sides of both the yokes 33 and 34 has a large magnetic resistance, it is preferable that the eccentric pins 43 inserted into the main plate 49 be disposed to the side surface portions of both the yokes 33 and 34 and both the yokes 33 and 34 be pressed against each other by the eccentric pins 43 so as to reduce magnetic leakage (loss). As shown in FIGS. 6 and 7, a joint member 46 composed of the PC member or the like is also attached under the yokes 33 and 34 or placed on the main plate 49 and both the yokes 33 and 34 are coupled to each other through the joint member 46.

It is preferable that the guide pins 45 and the screws 48 located on the joint sides film original guiding the yokes be also composed of a magnetic material such as amorphous or the like to secure magnetic flux passing through the yokes.

Further, the present invention is not limited to a two-pole generator composed of a pair of a N-pole and a S-pole as shown in FIGS. 2 to 7 and similarly applicable to a generator having four or more poles. For example, a highly effective generator with small iron loss can be provided by composing the yokes of the multi-pole generator disposed in Japanese Examined Patent Publication No. 7-69440 of the amorphous metal magnetic material according to the present invention. In addition, in the generator having no yoke disclosed in Japanese Unexamined Patent Publication No. 9-211152, when the generator is provided with a yoke, which is composed of a material having small iron loss such as the amorphous metal magnetic material and arranged in the hollow portion of a hollow coil of the generator, the miniaturization of the generator can be realized because much magnetic flux can be gathered, the thickness of a magnet can be reduced and the number of turns of a winding can be decreased.

Note that while the above embodiments relate to the generator of the wrist watch, they are similarly applicable to the motor of the wrist watch. That is, the same structure and the same material as those used in the generator can be also used in the motor.

EXAMPLE 1

Portable equipment of the example relates to the structure of FIG. 2 in the first embodiment.

A wrist watch was arranged by composing the first yoke 15 of an amorphous metal comprising 66Co-4Fe-1Ni-14B-15Si and the second yoke 17 of an amorphous metal comprising 78Fe-13B-9Si.

FIG. 8 shows the result of measurement of iron loss-frequency characteristics of the Co amorphous metal of the example. Further, FIG. 8 also shows the result of similar measurement executed to a conventional PC material (76Ni-4Mo-5.5Cu—Fe).

According to FIG. 8, it can be found that the iron loss of the Co amorphous metal of the example was reduced as compare with that of the conventional PC material in the rotation frequency when the wrist watch was worn and in the region where power was actually generated.

FIG. 9 shows the result of measurement of iron loss-frequency characteristics of the Fe amorphous metal of the example. Further, FIG. 9 also shows the result of similar measurement executed to a conventional PB material (46Ni—Fe).

According to FIG. 9, it can be found that the iron loss of the Fe amorphous metal of the example was reduced as compare with that of the conventional PB material in the rotation frequency when the wrist watch was worn and in the region where power was actually generated.

Therefore, according to the example, since the iron loss of the small generator is small, the size of the rotary movement weight can be reduced by the increase of the efficiency of the generator, whereby the watch can be reduced in thickness and size.

Further, the tensile stress of the Co amorphous metal of the example is about 100 Kg/mm$^2$, whereas the tensile stress of the PC material is about 50 Kg/mm$^2$. Thus, since the strength of the material of the Co amorphous metal of the example is twice that of the PC material, there is no possibility of deformation of the material and the material can be easily handled.

EXAMPLE 2

Portable equipment of the example relates to the structure of FIGS. 4 to 7 in the second embodiment. Note that the shapes and the structures of the yokes 33 and 34 relate to the structure shown in FIG. 5.

In the second embodiment, the wrist watch was arranged by composing the first yoke 33 and the second yoke 34 of the amorphous metal comprising 66Co-4Fe-1Ni-14B-15Si. The PC material was used as the material of the joint member 46.

The result of measurement of iron loss—frequency characteristics as to the Co amorphous metal of the example is as shown in FIG. 8. Thus, according to the example, since the iron loss of the small generator is small, a power generating efficiency is improved and a duration time is increased.

As shown in FIG. 10, the second yoke 34 (otherwise, the first yoke 33) may be composed of amorphous thin sheets 41 each having a different width and laminated along an ellipse shape. The thickness of each thin sheet 41 is set to, for example, 20–25 μm. An adhesive layer is composed of a polyester adhesive material or the like and set to a thickness of about 2 μm.

The second yoke 34 having the laminated-layer structure can be made by laminating the thin sheets 41 to each other by applying the adhesive material to the thin sheets 41 by transcription, curing the laminated member by leaving it at 200° C. for about 40 minutes and thereafter leaving it at 60° C. for about 1 week to 10 days.

When a wire is wound around a conventional yoke having a square cross section as shown in FIG. 11, an ellipse-shaped winding is made which is largely swelled up and down and right and left with respect to the square cross section of a coil core. In contrast, since the amorphous can be laminated to have the ellipse cross section as shown in FIG. 10, a winding can be made to have a shape near to the ellipse shape. Accordingly, when comparison is made as to the same sectional area, the length of the coil wire which is wound around the yoke once is shorter in the later case than in the former case, which leads to the reduction of copper loss.

The magnetic flux passing through the respective yokes was 0.182 μWb and a power generating efficiency was 14.5%.

Note that when the joint member 46 was not used, the magnetic flux was 0.136 μWb and the power generating efficiency was 12.8%.

Industrial applicability

According present invention, since at least a portion of the yoke is composed of the Co amorphous metal magnetic material or the Fe amorphous metal magnetic material and iron loss can be reduced thereby, the yoke can be used as the electromagnetic converter or the electronic equipment provided with it. The electromagnetic converter is also applicable to a motor such as a stepping motor and the like, in addition to the generator shown in the respective embodiments. The structure in the case is approximately the same as the structures shown in the figures according to the respective embodiments. The material and the characteristics of the motor are substantially the same as those shown in the respective embodiments and the respective examples. Further, exemplified as the electronic equipment provided with the electromagnetic converter of the present invention are, for example, a wrist watch, a wall clock, a clock, a portable personal computer, a pager, a portable phone, and the like.

What is claimed is:

1. An electronic timepiece comprising:

a generator comprising:
    a rotor including a permanent magnet;
    a yoke composed of sheets of amorphous magnetic material and disposed in the vicinity of said rotor in which magnetic flux flows, wherein said yoke comprises a stator comprising a Co amorphous metal magnetic material that is at least 50% Co by weight, and wherein no coil is wound around said stator;
    a coil disposed in the vicinity of said yoke,
    wherein said yoke comprises at least two magnetic members formed so as to be substantially in contact with each other partially or entirely through respective non-curved first and second side-faces thereof with no overlap between said two magnetic members, and at least one of said two members materials comprises the amorphous metal magnetic material; and
a pressure adjuster for adjusting a contact pressure of said first and second side-faces.

2. An electronic timepiece according to claim 1, further comprising a joint member for promoting the flow of magnetic flux between said two magnetic members, which are in contact with each other, said joint member being disposed on at least one of an upper side and a lower side of said two respective magnetic members.

3. An electronic timepiece according to claim 1, wherein said yoke comprises a coil core, on which a coil is wound, and said coil core comprises a Fe amorphous metal magnetic material.

4. An electronic timepiece according to claim 3, wherein said Fe amorphous metal magnetic material comprises 78Fe-13B-9Si.

5. An electronic timepiece according to claim 1, wherein said yoke includes a portion around which a no coil is wound, said portion being comprised of said Co amorphous metal magnetic material.

6. An electronic timepiece according to claim 5, wherein said Co amorphous metal magnetic material comprises 66Co-4Fe-1Ni-14B-15Si.

7. An electronic timepiece according to claim 1, further comprising an energy store of electromotive force of said generator, a timepiece circuit driven by said energy store, and a timepiece display unit driven by said timepiece circuit.

8. An electronic timepiece according to claim 1, further comprising:

a mainspring; and a train wheel;
wherein said generator converts mechanical energy of said mainspring transmitted through said train wheel into electric energy.

9. An electronic timepiece according to claim 1, further comprising:
a mainspring;
a train wheel;
a reference signal source;
a rotation controller;
wherein said generator converts mechanical energy of said mainspring transmitted through said train wheel into electric energy;
said reference signal source being driven by the converted electric energy;
and said rotation controller being responsive to the converted electric energy for controlling the rotation cycle of said generator.

10. An electronic timepiece according to claim 1, further including pressure adjustment means for adjusting the contact pressure of said non-curved sides at which said two magnetic members contact each other.

11. An electronic timepiece comprising:
a generator comprising:
a rotor including a permanent magnet;
a yoke disposed in the vicinity of said rotor in which magnetic flux flows, wherein said yoke comprises:
a stator comprising a Co amorphous metal magnetic material around which no coil is wound, said Co amorphous metal magnetic material being at least 50% Co by weight; and
a coil core comprising a Fe amorphous metal magnetic material around which a coil is wound, said Fe amorphous metal magnetic material being at least 50% Fe by weight; and
an energy store of electromotive force of said generator, a timepiece circuit driven by said energy store, and a timepiece display unit driven by said timepiece circuit.

12. An electronic timepiece according to claim 1, further comprising:
a mainspring;
train wheel;
time displaying hands coupled to said train wheel;
a reference signal source;
rotation controller;
wherein said generator converts mechanical energy of said mainspring transmitted through said train wheel into electric energy,
said reference signal source being driven by the converted electric energy; and
said rotation controller being responsive to the converted electric energy for controlling rotation cycle of said generator.

13. An electronic timepiece according to claim 11, wherein said stator is in contact with said coil core at respective non-overlapping and non-curved sides thereof; and
said generator further includes pressure adjustment means for adjusting the contact pressure of said non-curved sides at which said stator and coil core contact each other.

14. An electronic equipment comprising:
a generator comprising:
a rotor including a permanent magnet;
a yoke composed of sheets of amorphous magnetic material and disposed in the vicinity of said rotor in which magnetic flux flows, wherein said yoke comprises a stator comprising a Co amorphous metal magnetic material that is at least 50% Co by weight, and wherein no coil is wound around said stator;
a coil disposed in the vicinity of said yoke,
wherein said yoke is further comprised of at least two magnetic members formed so as to be substantially in contact with each other partially or entirely through respective non-curved first and second side-face thereof with no overlap between said two magnetic members, and at least one of said two magnetic members is composed of an amorphous metal magnetic material; and
a pressure adjuster for adjusting a contact pressure of said first and second side-faces.

15. An electronic equipment according to claim 14, further comprising a joint member for promoting the flow of magnetic flux between said two magnetic members in contact with each other, said joint being disposed on at least one of an upper side and a lower side of said two respective magnetic members.

16. An electronic equipment according to claim 14, wherein said yoke comprises a coil core, on which a coil is wound, and said coil core comprises a Fe amorphous metal magnetic material.

17. An electronic equipment according to claim 16, wherein said Fe amorphous metal magnetic material comprises 78Fe-13B-9Si.

18. An electronic equipment according to claim 14, wherein said yoke comprises a portion, around which a coil is wound, and said portion comprises a Co amorphous metal magnetic material.

19. An electronic equipment according to claim 18, wherein said Co amorphous metal magnetic material comprises 66Co-4Fe-1Ni-14B-15Si.

20. An electronic equipment according to claim 14, further comprising an energy store of electromotive force of said generator, an equipment circuit driven by said energy store, and a equipment display unit driven by said equipment circuit.

21. An electronic equipment according to claim 14, further comprising:
a mainspring;
train wheel;
time displaying hands coupled to said train wheel;
a reference signal source;
rotation controller;
wherein said generator converts mechanical energy of said mainspring transmitted through said train wheel into electric energy.
said reference signal source being driven by the converted electric energy; and
said rotation controller being responsive to the converted electric energy for controlling rotation cycle of said generator.

22. An electronic equipment according to claim 14, further comprising:
a mainspring; and a train wheel;
wherein said generator converts mechanical energy of said mainspring transmitted through said train wheel into electric energy.

23. An electronic equipment according to claim 14, further comprising:
a mainspring;
a train wheel;
a reference signal source;
a rotation controller;

wherein said generator converts mechanical energy of said, mainspring transmitted through said train wheel into electric energy:

said reference signal source being driven by the convened electric energy:

and said rotation controller being responsive to the converted electric energy for controlling the rotation cycle of said generator.

24. An electronic equipment comprising:

a generator comprising:
- a rotor including a permanent magnet;
- a yoke disposed in the vicinity of said rotor in which magnetic flux flows, wherein said yoke comprises:
  - a stator comprising a Co amorphous metal magnetic material around which no coil is wound, said Co amorphous metal magnetic material being at least 50% Co by weight; and
  - a coil core comprising a Fe amorphous metal magnetic material around which a coil is wound, said Fe amorphous metal magnetic material being at least 50% Fe by weight; and an energy store of electromotive force of said generator, an equipment circuit driven by said energy store, and an equipment display unit driven by said equipment circuit.

* * * * *